United States Patent [19]

White

[11] 4,142,746
[45] Mar. 6, 1979

[54] STRAND TYING MECHANISM

[75] Inventor: Allen A. White, Peabody, Kans.

[73] Assignee: Hesston Corporation, Hesston, Kans.

[21] Appl. No.: 833,565

[22] Filed: Sep. 15, 1977

Related U.S. Application Data

[62] Division of Ser. No. 742,178, Nov. 16, 1976, Pat. No. 4,074,623.

[51] Int. Cl.² ............................................ A01D 59/04
[52] U.S. Cl. ............................................ 289/2; 100/3; 100/19 R; 100/31
[58] Field of Search .................... 289/2, 5, 10, 11, 13, 289/14, 15; 100/4, 11, 19 R, 19 A, 31, 192

[56] References Cited

U.S. PATENT DOCUMENTS

| | | | |
|---|---|---|---|
| 2,585,425 | 2/1952 | Baskerville | 100/19 R |
| 2,595,503 | 5/1952 | Altgelt | 100/19 R |
| 2,763,501 | 9/1956 | Rudeen | 289/10 |
| 3,101,963 | 8/1963 | Sullivan et al. | 289/2 X |
| 3,400,959 | 9/1968 | Grillot | 289/2 |
| 3,615,112 | 10/1971 | Minke | 289/13 |
| 3,712,654 | 1/1973 | Nolt et al. | 289/2 |

Primary Examiner—Louis Rimrodt
Attorney, Agent, or Firm—Schmidt, Johnson, Hovey & Williams

[57] ABSTRACT

In a crop baler each compacted bale is progressively formed in the bale chamber and incrementally advanced therethrough by the successive packing of new charges of loose material into the chamber against the trailing end of the partial bale. Yieldable resistance to movement of the bale through the chamber is normally provided by a previously formed and tied bale in order that the forming bale may be packed and densified in the proper way. Each bale is bound in its compacted condition by at least one complete loop of binding material, each loop consisting of a pair of separate strands from two separate sources of supply. The two strands of each loop are circumferential complements of one another and are connected together at the two locations where they are substantially end-to-end such that each binding loop contains two knots or other types of strand connections, depending upon the nature of the binding material selected for use. Each loop is so formed and tied that the portion thereof which extends through the pressurized interface between a previous bale and the one being formed remains substantially stationary with respect to the bales throughout the bale-forming and bale-tying sequences instead of being pulled through such interface during that period, thereby substantially alleviating the tension under which the loop is formed.

5 Claims, 17 Drawing Figures

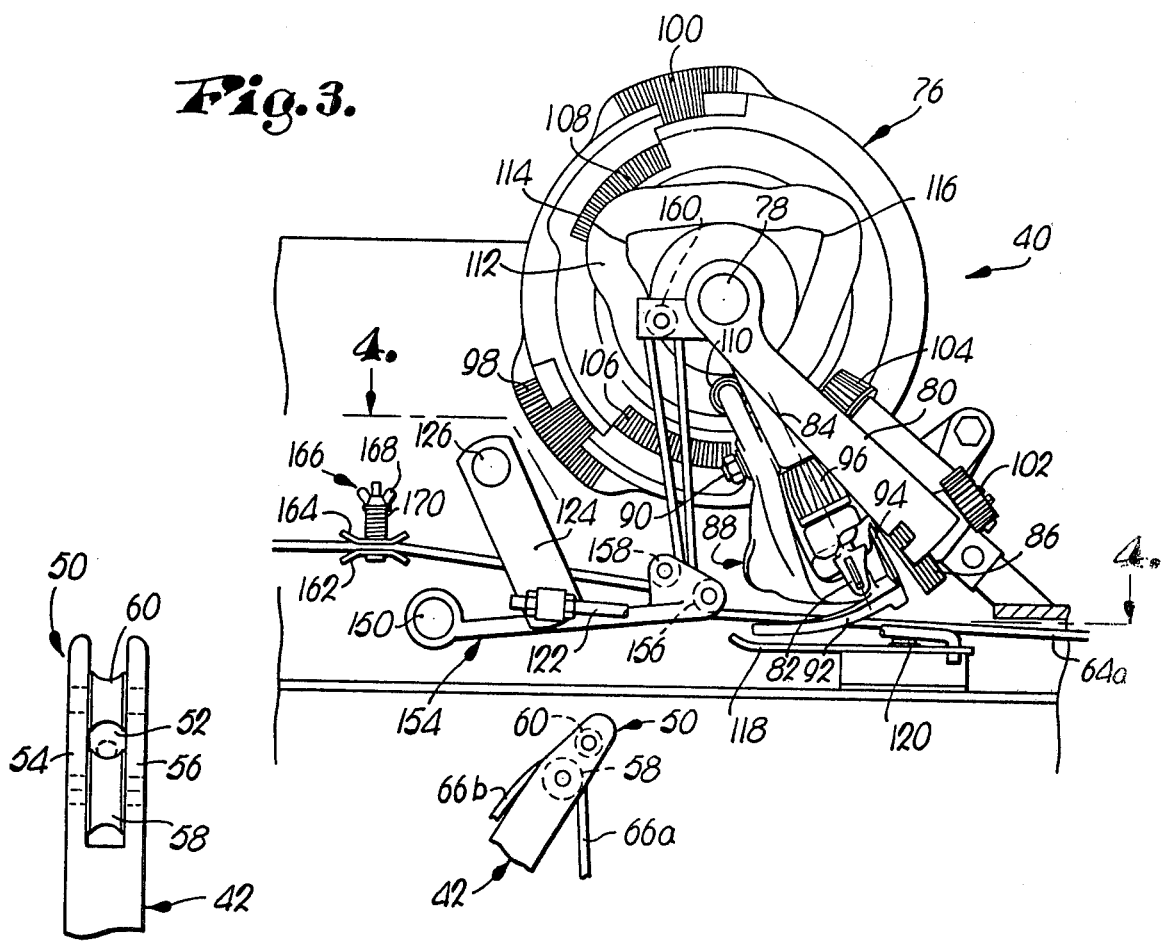
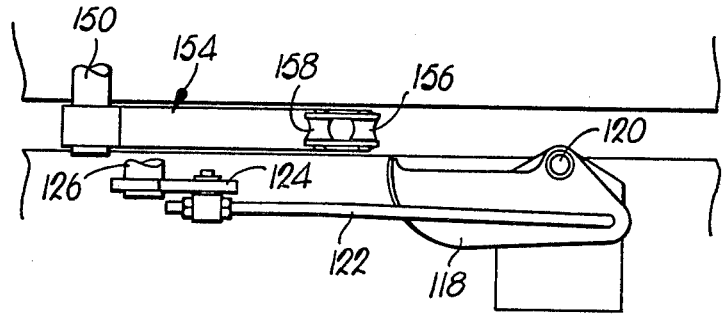
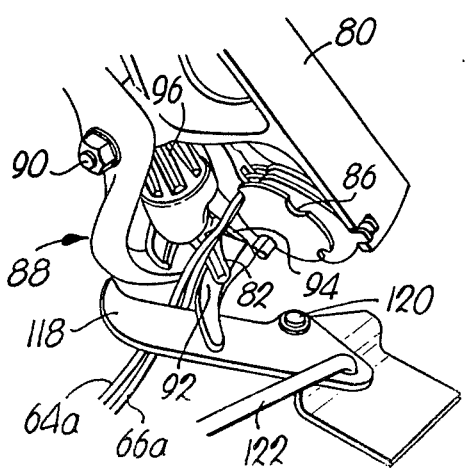

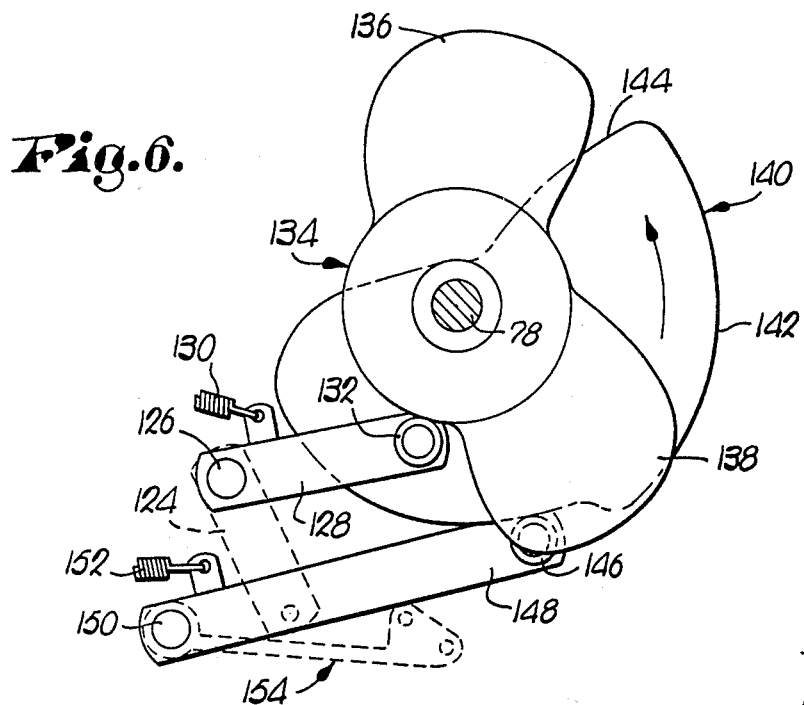
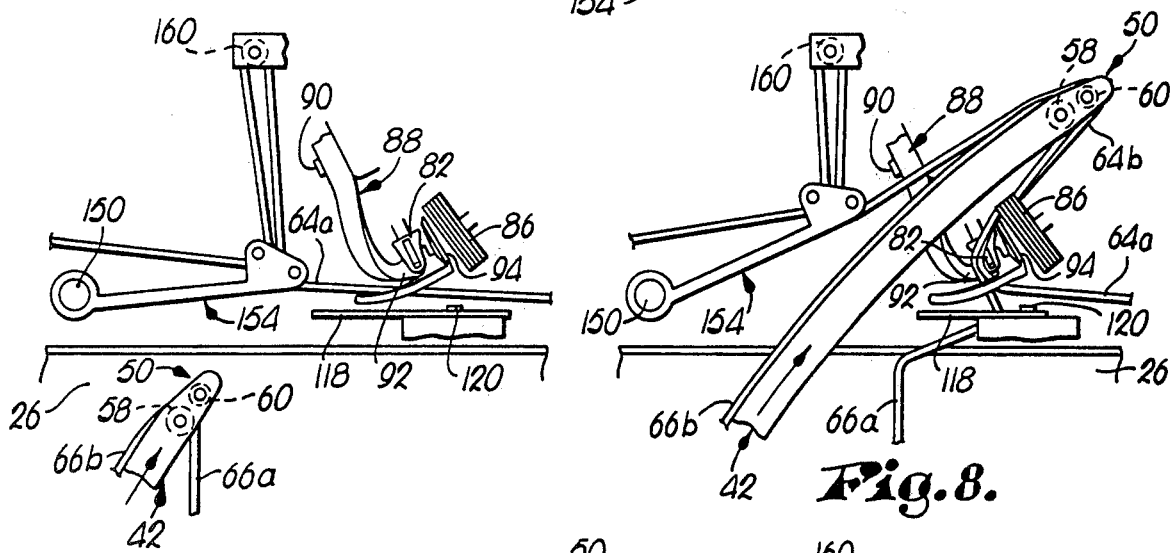
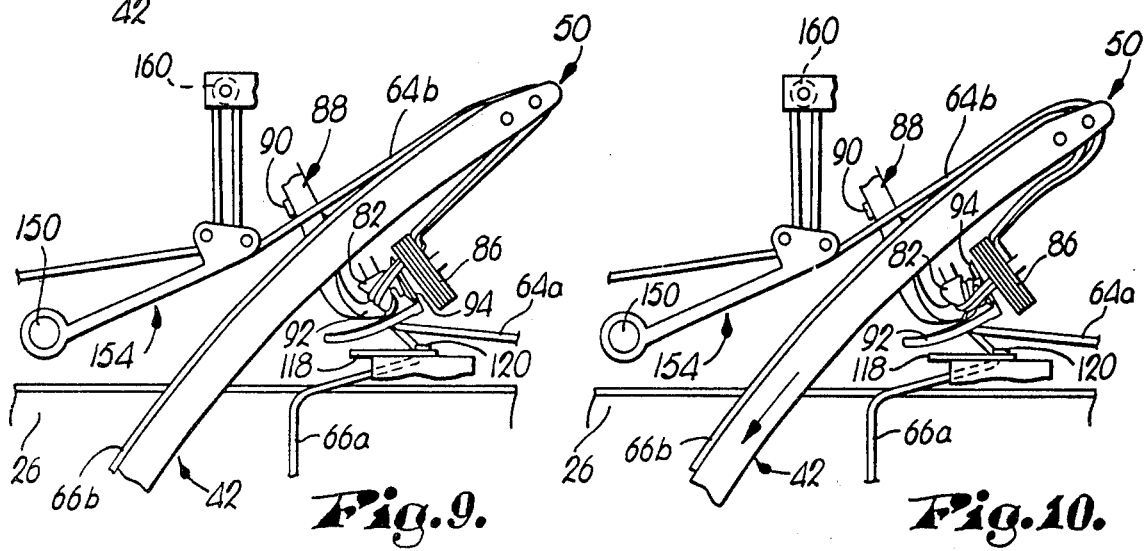

STRAND TYING MECHANISM

This is a division of application Ser. No. 742,178, filed on Nov. 16, 1976, now U.S. Pat. No. 4,074,623, issued Feb. 21, 1978.

This invention relates to a way of binding bales of harvested crop material or other substances so that the bales may be handled, stored or otherwise manipulated without breaking apart. In many instances, such bales are prepared under conditions of substantial pressure so that the finished product is considerably more dense than the loose material from which it is made.

While it may generally be stated that increased density in such bales is a highly desirable objective, obtaining that goal has in many respects been thwarted because of the limitations of conventional wire and twine tying mechanisms. Beyond a certain level of tension in the wire or twine strands, the mechanisms experience difficulty in holding on to the strands and manipulating the same through the various motions involved in tying the opposite ends of the strands into a satisfactory knot or other type of connection. Moreover, the strands themselves can only withstand certain levels of tension before they will break.

Under practices which are fairly commonplace in baling operations today, one area in which substantial tension is created in the strands stems from the procedure of pulling the strands between the tightly abutting ends of a previous bale and the one being formed in order to progressively lengthen the material in the loop until the forming bale reaches its predetermined size, at which point the opposite ends of the loop are simply tied together and the bale is thereby securely bound. The need to pull the strands between the abutting bales in this manner arises because each strand has one end thereof retained by the tying mechanism while the rest of the strand is draped across the bale chamber. As the growing bale is pushed through the chamber, it presses against the strand draped across the chamber and, because one end is anchored at the tier, the strand must be pulled between the bales by the tier in order to increase the length of the strand along that side of the bale adjacent the tier. While the tension may be relatively low in the strand along its length between the source of supply and the bales, the tension will necessarily be quite higher along that length from the bales to the tier. It is along this latter length that troubles arise.

Accordingly, one important object of the present invention is to provide a way of achieving high density baling without subjecting the binding materials and the mechanisms which tie them to excessively high tension and stresses during the baling and binding operations.

Another important object of this invention is to provide the foregoing regardless of whether the particular binding material selected for use is wire or twine.

Pursuant to the foregoing objects, a further important object of this invention is to eliminate the need for pulling the strands through the interface between the tightly abutting ends of successive bales and to, in fact, leave that portion of each binding loop substantially stationary relative to the bales throughout the baling and binding processes. This is accomplished by making each binding loop from a pair of separate strands, each having its own source of supply, and arranging such strands that, while initially tied together to start a loop which the growing bale can fill, additional lengths of the strands needed by the bale as it grows in size and moves through the bale chamber are pulled and obtained only under the resistance offered by the sources of supply themselves and any auxiliary tensioning devices that might be employed. The finished loop therefore has two knots or connections at the starting and finishing points of the loop and at generally opposite ends of the bale instead of only one of such connectiions as has heretofore been customary.

Another important object of this invention is to achieve the above objectives without doubling the number of tiers required to form the double-knotted loop and without increasing the total amount of binding material that is required to effectively bind the bale.

Other important objects of the present invention include the provision of an improved needle for presenting two binding strands simultaneously and in unison to the tier, mechanism for taking up any slack which might otherwise occur in the strands during the tying cycle so as to eliminate any opportunity for entaglement of the otherwise slack strands in the tying mechanism, and achieving the double-knotting operation without increasing the amount of time required to completely bind the bale.

In the drawings:

FIG. 3 is an enlarged, fragmentary, elevational view of the tier, needle and associated mechanisms in mid cycle;

FIG. 4 is a fragmentary, plan view thereof taken substantially along line 4—4 of FIG. 3;

FIG. 5 is a fragmentary, front perspective view of the tier with strands draped across the bill hook and held by the retaining discs in readiness to prepare a knot;

FIG. 6 is a fragmentary, elevational view of cams on the drive shaft of the tier for operating the slack take-up arm and the twine finger which assist during the tying operation;

FIGS. 7–16 are fragmentary, schematic views which illustrate the steps in the double-knotting operation; and FIG. 17 is an enlarged, front elevational view of the tip of the needle which presents the strands to the tier, illustrating details of construction thereof.

In the description which follows and in certain passages already set forth, the principles of the present invention will be described in terms of "twine" and "knots" formed in such twine. However, it is to be recognized that such principles extend to wire and twisted junctions of wire as well as twine and knots. The claims should be interpreted accordingly.

Figure 1:
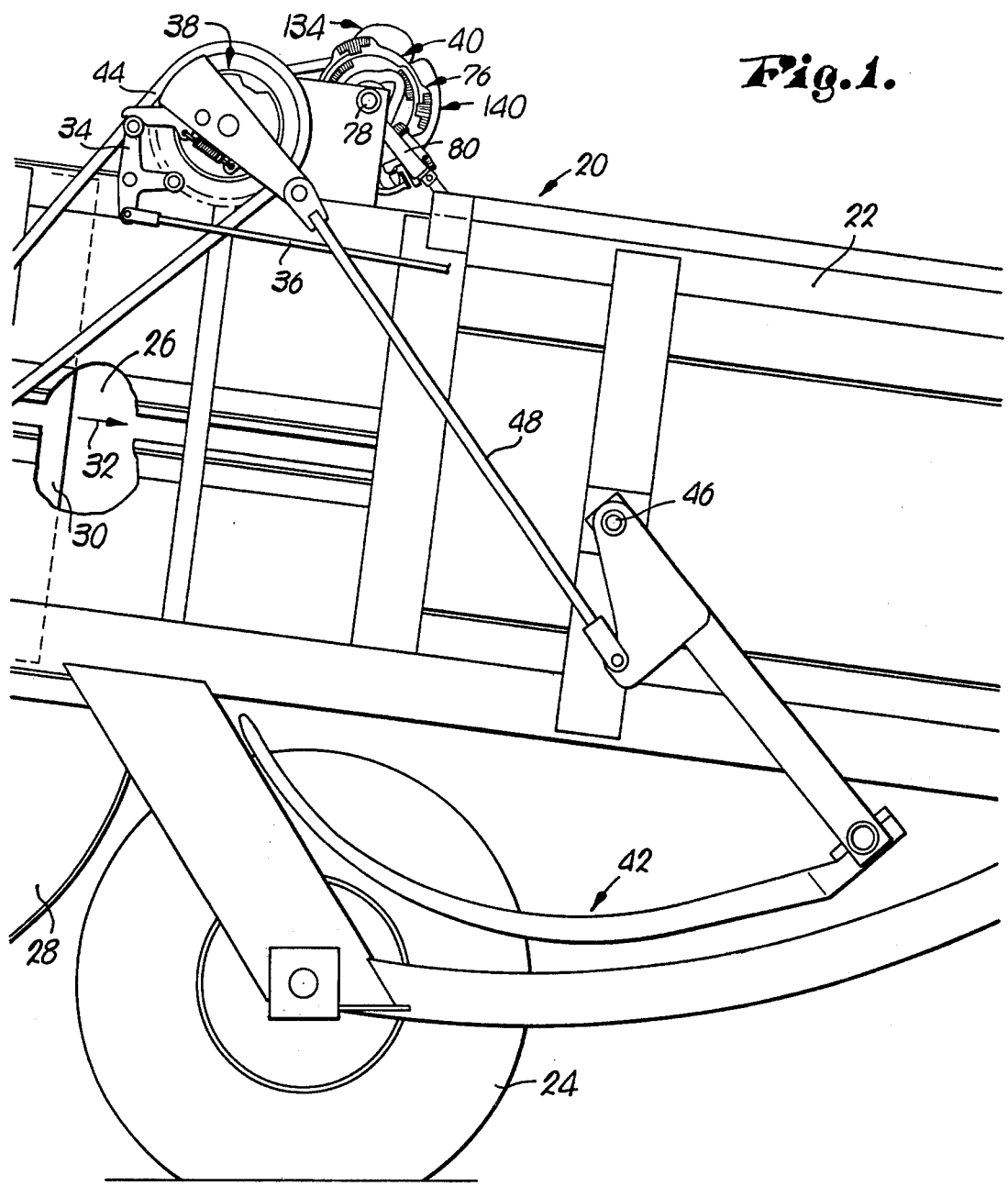
FIG. 1 is a fragmentary, elevational view of a baler utilizing tying apparatus and method in accordance with the principles of the present invention.

The baler 20 illustrated in FIG. 1 has a rectangular bale case 22 that happens to be supported for over-the-ground travel by one or more ground wheels 24. The bale case 22 defines a bale chamber 26 that happens to be loaded through a curved duct 28 approaching the case 22 from the bottom thereof. A plunger 30 reciprocates within the bale case 22 to intermittently pack fresh charges of material from the duct 28 rearwardly in the chamber 26 in the direction of the arrow 32. When the bale reaches a predetermined size, a trigger 34 is pulled by a rod 36 connected to a suitable bale length sensor (not shown) to engage a dog clutch 38. This connects a tier 40 and its needle 42 to a source of driving power from the drive chain 44 associated with the clutch 38 whereby to initiate the tying operation.

The needle 42 is swingably mounted on the bale case 22 by a pivot 46 and is swung back and forth across the bale chamber 26 by linkage 48 which becomes activated by the clutch 38. The needle 42 has an "at-home" or rest position fully below the bale case 22 as illustrated in FIG. 1 and a "full-throw" position extended completely across the bale case 22 as illustrated, for example, in FIG. 8. As illustrated perhaps most clearly in FIGS. 3 and 17, the tip 50 of needle 42 has an eyelet 52 defined therein by the opposed furcations 54 and 56 of the bifurcated tip 50 in conjunction with a pair of longitudinally spaced, transversely extending rollers 58 and 60. It will be noted that the roller 58 is positioned inwardly from the outer extremity of the tip 50, while the roller 60 is positioned outwardly from the roller 58 more closely adjacent such extremity. Even so, the roller 60 is positioned a short distance inwardly from the outer extremity of the tip 50, and both of the rollers 58 and 60 may be tapered toward their mid points so as to provide secure seats for the tying strands as will later become apparent.

As will also become apparent, while the structures 58 and 60 have been illustrated in the nature of rollers, they may in fact take the form of stationary transverse structures such as cross pins, for example, without falling outside the scope of the present invention.

Figure 2:
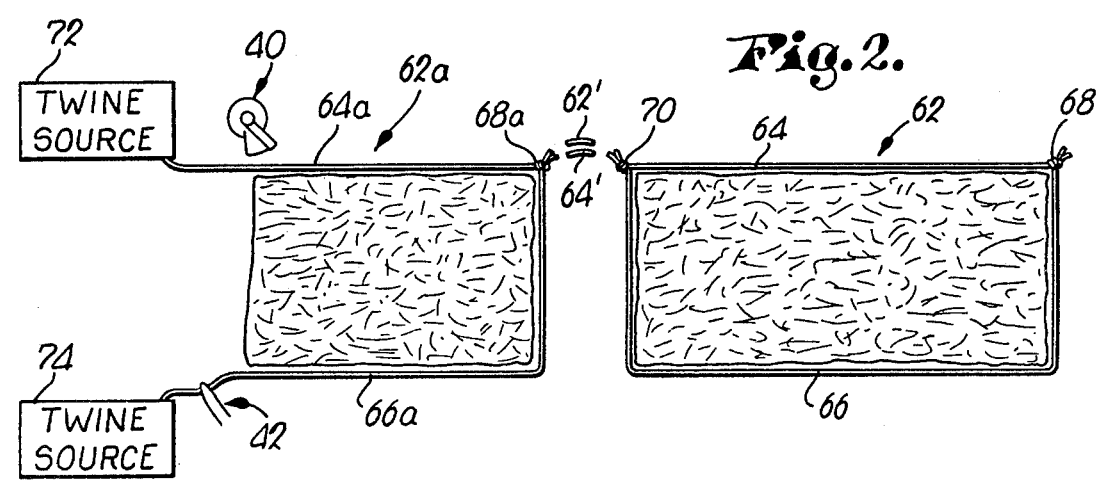
FIG. 2 is a diagrammatic view of a complete and a partial double-knotted loop in order to illustrate the principles of the present invention.

It is suggested at this point that reference be made to FIG. 2 which shows the nature of the binding loop that is involved in the present invention. By reference now to this illustration, it is felt that the details of construction hereinafter described, and the operation hereinafter explained will become more easily understood.

To this end, then, it is to be noted that the finished product is in the nature of a complete loop 62 that will completely circumscribe the finished bale. The loop 62 is made from two strands of binding material, i.e., one strand 64 along the normally top side of the bale and a second strand 66 along the normally bottom of the bale and its two opposite ends. The strands 64 and 66 thus fully circumscribe the bale and are circumferential complements of one another. Two knots 68 and 70 appear in the loop 62 at those locations where the strands 64 and 66 are substantially end-to-end.

To the left of the loop 62 is a partial loop 62a which is in the process of being formed. Note that the top strand 64a emanates from a source of supply 72, while the bottom strand 66a emanates from an entirely separate, second source of supply 74. At the particular point in the sequence chosen for illustration, the knot 68a is in existence, and the bale is approaching that length where the needle 42 is ready to swing into operation and present the strands 64a and 66a to the tier 40 to complete the second knot 70a *(not shown)*.

With this short explanation in mind, the details of construction as illustrated primarily in FIGS. 3, 4, 5, and 6 may now be described. The tier 40 is identical in many respects to a "Deering" type knotter available from P. D. Rasspe Sohne, Hamburg, West Germany. That is to say, the components of the tier 40 which cooperate to *form* each of the knots of a bale may be identical to those in a unit provided by the Rasspe Company. However, the means for *operating* such components in the manner intended by the present invention must be different. Such means in the present invention include a generally circular element 76 that is secured to a drive shaft 78 for rotation with the latter through one full revolution when the clutch 38 is engaged. The shaft 78 is supported by a forwardly inclined frame 80 attached to the top of the bale case 22, and the frame 80 also supports the above-mentioned components for forming the knots in response to rotation of the element 76.

Briefly, such components include a rotary bill hook member 82 supported by the frame 80 for rotation about an inclined axis 84, a mutli-disc holder 86 rearwardly adjacent the bill hook 82 for holding strands 64a and 66a in position for engagement by the bill hook 82 during rotation of the latter, and means for releasing the connected strands from the holder 86 in the form of an arm 88 pivoted to the frame 80 by a bolt 90. The lower end of the arm 88 is forked, defining a crotch 92 that opens away from the holder 86 beneath the bill hook 82. The crotch 92 carries a cutter 94 between the bill hook 82 and the holder 86 for severing the strands 64a, 66a in response to swinging movement of the arm 88 in the proper direction. Such movement of the arm 88 to operate the cutter 94 also serves to engage the proximal areas of the crotch 92 with a knot formed on the bill hook 82 for stripping such knot off of the bill hook 82.

In order to transmit driving power from the element 76 to the bill hook 82, the latter is provided with a gear 96 which is disposed for meshing engagement with a pair of circumferentially spaced gear stretches 98 and 100 on the element 76. Similarly, driving power is transmitted to the discs of the holder 86 through a worm gear drive 102 and a bevel gear 104 in position for sequential meshing engagement with a pair of circumferentially spaced gear sections 106 and 108 on the element 76. Power to swing the arm 88 about the pivot bolt 90 is obtained through a cam follower 110 at the upper end of the arm 88 beyond the pivot bolt 90 which is disposed within a cam track 112 on the element 76. A pair of circumferentially spaced cam shoulders 114 and 116 in the track 112 are positioned to sequentially engage the follower 110 to operate the latter.

A finger 118, which is in itself not per se new, is located below the bill hook 82 and the crotch 92 of the tier 40 and is mounted on an upright pivot 120 for lateral swinging movement between a standby position illustrated in FIGS. 3 and 4 and a full-throw, laterally extended position somewhat beyond that illustrated in FIG. 5. An operating link 122 attached at one end to the finger 118 and at the opposite end to a crank 124 serves to effect swinging of the finger 118. The crank 124 is in turn fixed to a transversely extending shaft 126 that extends to a point behind the element 76 where it carries a second crank 128 as illustrated in FIG. 6. The crank 128 is biased upwardly in a counterclockwise direction by a coil spring 130 and carries a cam follower 132 at its outermost end. The follower 132 is in position for operating engagement with a double-lobed cam 134 fixed to the shaft 78 for rotation therewith, the lobes 135 and 138 being circumferentially spaced apart in accordance with the desired timed relationship between the finger 118 and the knot-forming components of the tier 40.

Also mounted on the shaft 78 with the cam 134 is a second cam 140 having a peripheral land stretch 142 over approximately 180 degrees of its circumference and a peripheral valley stretch 144 over the remaining approximately 180° of its circumference. Such stretches 142 and 144 are disposed for operating engagement against a cam roller 146 located at the outer end of a lever 148 that is fixed at its inner end to a transverse shaft 150. The lever 148, and hence the shaft 150, is biased yieldably in a counterclockwise direction viewing FIG. 6 by a coil spring 152, and the shaft 150 extends back out to the opposite side of the element 76 in parallelism with the shafts 78 and 126 to a point substantially in fore-and-aft alignment with the bill hook 82.

At that location, the shaft 150 fixedly carries a rearwardly extending slack take-up device 154. The device 154 carries a pair of spaced rollers 156 and 158 at its rearmost end around which the strand 64a is entrained as illustrated in FIG. 3. A length of the strand 65a is also looped upwardly around another roller 160 disposed above the device 154 and carried by the tier frame 80 adjacent the drive shaft 78.

Noteworthy also at this point is the fact that the strand 64a may be yieldably clamped between a pair of opposed plates 162 and 164 (FIG. 3) of a tensioning unit 166. The force with which the plates 162 and 164 clamp the strand 64a may be controlled by a wing nut 168 operating against a spring 170 that in turn presses against the shiftable plate 164. A tensioning unit similar to unit 166 may also be provided for the strand 66a, although such additional unit is not illustrated.

OPERATION

The condition of the partial loop 62a in FIG. 2, and that of the tier 40 and the needle 42, corresponds substantially with conditions illustrated in FIGS. 3, 4 and 7, with the exception that in FIG. 2, the needle 42 is still in its home position. At this time, the bale has reached its desired length and it is time to complete the loop around the bale and make the second knot in the loop. Note that the strand 64a stretches along the top of the bale directly beneath the crotch 92 of the arm 88 but, at least for all effective purposes, is out of contact with the tier 40.

As illustrated in FIG. 7, as the needle 42 swings upwardly toward the tier 40, it carries with it the strand 66a as the latter is paid out by source 74. Note also that because the strand 66a is threaded through the eyelet 52 of needle 42, a length of that strand on the twine source side of the needle 42 is also carried upwardly toward the tier 40, such extra length being hereinafter denoted 66b.

During the time that the needle 42 approaches the tier 40, no additional length of the strand 64a is pulled from the source 72. Even as the tip of the needle 42, and more particularly the roller 60, snares the strand 64a as illustrated in FIG. 8 and presents strands 64a and 66a in unison to the tier 40, still no additional length of the strand 64a is pulled from source 72 because the device 154 rocks upwardly in a counterclockwise direction to provide the slack necessary in the strand 64a to accommodate the needle movement. In presenting the strands 64a and 66a, the needle 42 actually drapes the strands across the bill hook 82 and thence into awaiting notches of the holder 86, whereupon rotation of cooperating discs in the latter serve to firmly grip the strands and prevent their escape as the bill hook 82 begins its rotation as illustrated in FIG. 9. Note that during the time that the strands are being delivered across the bill hook 82 to the holder 86, the finger 118 is actuated to swing inwardly and engage at least the strand 66a as illustrated in FIGS. 8 and 9 for the purpose of seating the same deeply within the crotch 92 so as to assure that the strands 64a and 66a are both in proper position across the bill hook 82.

Figure 11:
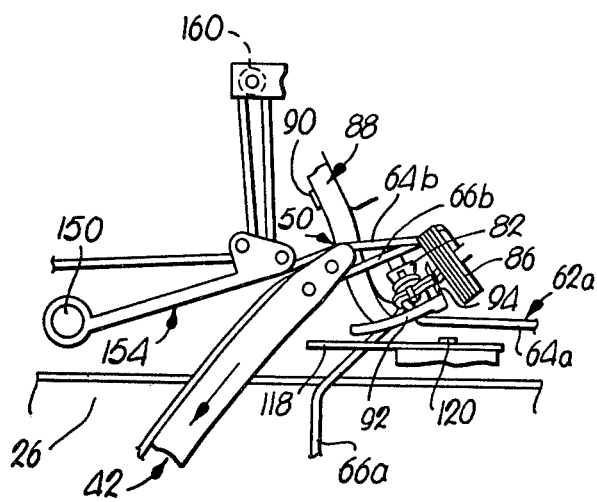
Figure 12:
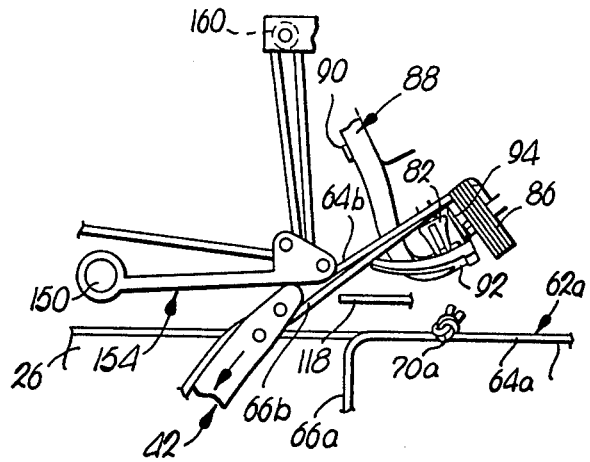

The foregoing movements on the part of the bill hook 82 and the holder 86 are, of course, brought about by operable interengagement of the gear stretch 98 and gear section 106 on the element 76 with their respective gears 96 and 104 on the bill hook 82 and the holder 86. Such driving interengagement continues until a knot has been formed on the bill hook 82 as illustrated in FIGS. 10 and 11, by which time the needle 42 has begun to withdraw. At this point, the cam shoulder 114 of the element 76 comes into engagement with the roller 110 of the arm 88 so as to swing the bottom of the latter, and hence the cutter 94, across that portion of the strands between the bill hook 82 and the holder 86, thereby severing the same as illustrated in FIG. 11. Such motion of the arm 88 also strips the finished knot 70a from the bill hook 82 and drops the completed loop on the bale as illustrated in FIG. 12.

Figure 13:
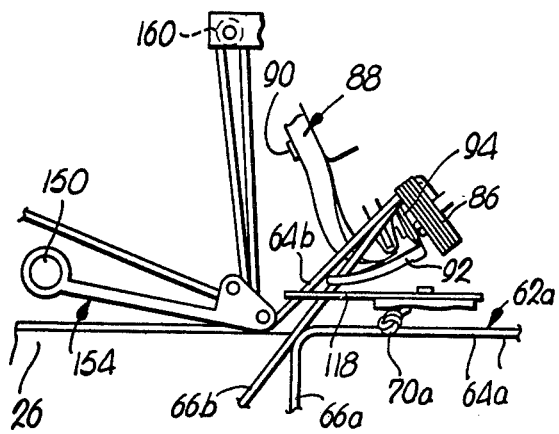
Figure 14:
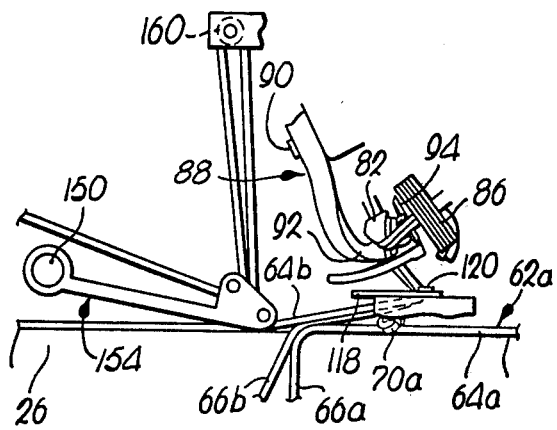
Figure 15:
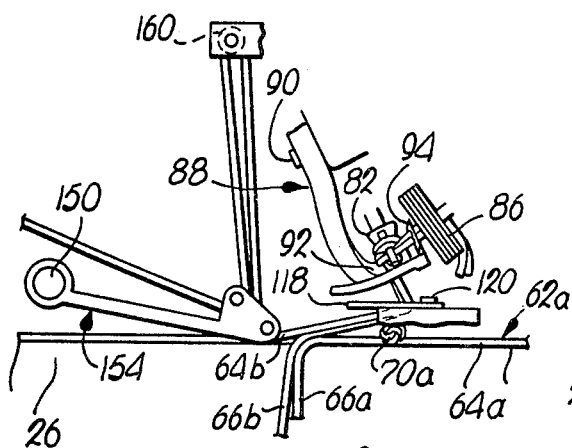

While the knot 70a is dropped by the tier 40 following severance and stripping from the bill hook 82, the strand 66b to source 74, as well as strand 64b to source 72, is retained by the holder 86. Consequently, as the needle 42 continues to retract, the strand 66b is draped downwardly across the bale chamber 26 while the slack take-up device 154 lowers to its normal position to pull a small amount of additional material from the source 72. Upon reaching the condition illustrated in FIG. 13, the strands 64b and 66b are in position for institution of the second tying cycle which is started by the finger 118 (which has been previously returned to its standby position) swinging inwardly to engage the strands 64b and 66b and seat them deeply within the crotch 92 as shown in FIG. 14. This assures that the strands 64b and 66b are properly positioned across and in engagement with the bill hook 82, whereupon the latter and the holder 86 are operated by their second respective gear stretch 100 and gear section 108 on the element 76. Thus, the knot becomes formed as illustrated in FIG. 15, whereupon the arm 88 is once again actuated, but this time by the second cam shoulder 116, to sever the knot from the holder 86 and to strip the same from the bill hook 82. This becomes knot 68b in FIG. 16, and it will be recognized that such joinder of the strands 64b and 66a is the start of a new loop which, although not illustrated, would be numbered 62b. Such new loop, at its inception, takes the form of an open-ended bight along the lines of, but much shorter than, the partial loop 62a in FIG. 2. Such bight is in position to receive new material that is packed into the bale chamber 26 by the plunger 30, and the bight grows in length as additional lengths of the strands 64b and 66b are simultaneously pulled from their sources 72 and 74. Finally, when the bale has reached its desired size, the sequence returns to its starting point, whereupon the bight is closed by operation of the needle 42 to complete the loop around the bale and from the second knot.

Figure 16:
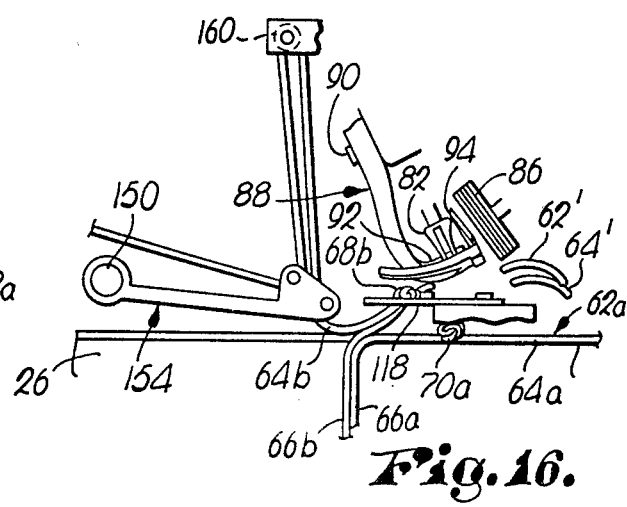

As illustrated in FIG. 2, and as also shown in FIG. 16, two short segments 62' and 64' are released by the holder 86 following completion of the tying sequence and in preparation for start of the next sequence. Such segments are left as a result of the surplus strands that are contained within the discs of the holder 86 following the two cutting strokes of the cutter 94.

It should be apparent from the foregoing that two complete tying cycles are carried out during each single revolution of the drive shaft 78. Thus, each time the needle 42 swings into operation, two knots are formed by the tier 40. One knot is the second knot 70 on the preceding bale, and the other is the first knot 68 on the next succeeding bale. The cutter 94 operates to sever the two knots from one another, thereby also disconnecting the two bales from each other.

Of considerable importance is the fact that once the strand 66 is drawn across the bale chamber 26 by the withdrawing needle 42 and the knot 68 is formed, the strands 64 and 66 remain substantially stationary relative to the forming bale throughout the remainder of the bale-forming and knot-tying processes. The additional lengths of binding material required to accommodate growth of the forming bale are readily obtained from the two separate sources of supply 72 and 74, the resistance to such strand pulling being only that exerted by the sources 72, 74 themselves and by any tensioning control units that may be utilized such as the unit 166 in FIG. 3. There is no need to pull either strand through the interface formed between the tightly abutting preceding bale and the one being formed, and thus the strands, as well as the tier 40, avoid the application of excessive tension and stresses.

Having thus described the invention, what is claimed as new and desired to be secured by Letters Patent is:

1. Tying mechanism for use in knotting a pair of strands together at two separate locations along the length of the strands so as to form a complete loop between the knots for binding a bale of crop material or the like, said mechanism including:
   an intermittently operable drive shaft;
   a single set of components operable during each cycle of operation thereof to make a single knot in the strands; and
   means between said shaft and the components for driving the components through a pair of said cycles during each said operation of the shaft,
   said driving means for the components being operable to effect the cycles of each pair thereof successively such that the knots formed during each corresponding pair of cycles are likewise formed successively.

2. Tying mechanism as claimed in claim 1, wherein said components include:
   a rotary tying member;
   a holder for receiving and retaining the strands in position for engagement with said member during rotation of the latter; and
   means for releasing knotted strands from the holder.

3. Tying mechanism as claimed in claim 2, wherein said releasing means includes a cutter disposed when operated to sever knotted strands from the holder.

4. Tying mechanism as claimed in claim 3, wherein said cutter has means associated therewith for simultaneously stripping a knot from said tying member during operation of the cutter.

5. Tying mechanism as claimed in claim 1, wherein said means for driving the components includes an element fixed to said shaft for rotation therewith and dual, circumferentially spaced sets of structures on said element that are operably engageable with said tying member, said holder and said releasing means, respectively, during rotation of the element to complete a pair of said cycles during each single revolution of said shaft.

* * * * *